US009800301B2

(12) United States Patent
Park et al.

(10) Patent No.: US 9,800,301 B2
(45) Date of Patent: Oct. 24, 2017

(54) ANTENNA SHARING DEVICE FOR WIRELESS ACCESS NODE SYSTEMS IN WIRELESS COMMUNICATION NETWORK

(71) Applicant: KMW Inc., Hwaseong, Gyeonggi-Do (KR)

(72) Inventors: Nam-Shin Park, Gyeonggi-Do (KR); Don-Yong Lee, Gyeonggi-do (KR)

(73) Assignee: KMW INC., Hwaseong, Gyeonggi-do (KR)

( * ) Notice: Subject to any disclaimer, the term of this patent is extended or adjusted under 35 U.S.C. 154(b) by 129 days.

(21) Appl. No.: 14/845,955

(22) Filed: Sep. 4, 2015

(65) Prior Publication Data
US 2015/0381243 A1    Dec. 31, 2015

Related U.S. Application Data

(63) Continuation of application No. PCT/KR2014/001763, filed on Mar. 4, 2014.

(30) Foreign Application Priority Data

Mar. 4, 2013 (KR) .................. 10-2013-0022719
Apr. 26, 2013 (KR) .................. 10-2013-0046906

(51) Int. Cl.
*H04B 7/005* (2006.01)
*H04B 7/0413* (2017.01)
(Continued)

(52) U.S. Cl.
CPC .............. *H04B 7/0413* (2013.01); *H04B 1/40* (2013.01); *H04B 7/04* (2013.01); *H04W 88/08* (2013.01)

(58) Field of Classification Search
CPC ....................................................... H04B 1/40
See application file for complete search history.

(56) References Cited

U.S. PATENT DOCUMENTS

2006/0003808 A1   1/2006   Haskell et al.
2006/0145781 A1   7/2006   Layne et al.
(Continued)

FOREIGN PATENT DOCUMENTS

CN    1797971 A      7/2006
JP    2006-503465 A  1/2006
(Continued)

OTHER PUBLICATIONS

JP Office Action issued on Sep. 26, 2016 in corresponding Japanese Patent Application No. 2015-561267.
(Continued)

*Primary Examiner* — Shaq Taha
(74) *Attorney, Agent, or Firm* — Mintz Levin Cohn Ferris Glovsky and Popeo, P.C.; Kongsik Kim; Carolina Säve

(57) ABSTRACT

The present invention relates to a device for sharing the antennas of wireless access node systems in a wireless communication network comprising a wireless access node system A and a wireless access node system B, each of which comprises at least one transmission/reception unit for processing transmission/reception signals in at least one frequency band, the device comprising: an MIMO coupler A for coupling a signal in a first transmission/reception route among multiple input multiple output (MIMO) routes for said at least one transmission/reception unit of the wireless access node system A, and a signal in a second transmission/reception route among MIMO routes for said at least one transmission/reception unit of the wireless access node system B, to the antenna of the wireless access node system A; and an MIMO coupler B for coupling a signal in a first transmission/reception route among the MIMO routes for said at least one transmission/reception unit of the wireless access node system B, and a signal in a second transmission/reception route among the MIMO routes for said at least one (Continued)

transmission/reception unit of the wireless access node system A, to the antenna of the wireless access node system B.

8 Claims, 12 Drawing Sheets

(51) Int. Cl.
  *H04B 7/04* (2017.01)
  *H04B 1/40* (2015.01)
  *H04W 88/08* (2009.01)

(56) References Cited

U.S. PATENT DOCUMENTS

| | | |
|---|---|---|
| 2009/0262669 A1 | 10/2009 | Sanders |
| 2010/0151907 A1 | 6/2010 | Han et al. |
| 2011/0069644 A1 | 3/2011 | Kim et al. |
| 2011/0092171 A1 | 4/2011 | Delforce |
| 2012/0329523 A1 | 12/2012 | Stewart et al. |
| 2013/0023304 A1 | 1/2013 | Raghuraman |

FOREIGN PATENT DOCUMENTS

| | | |
|---|---|---|
| JP | 2013-504924 A | 2/2013 |
| KR | 10-0711015 B1 | 4/2007 |
| KR | 10-2008-0114104 A | 12/2008 |
| KR | 10-2011-0098687 A | 9/2011 |
| WO | WO-2012-044969 A1 | 4/2012 |

OTHER PUBLICATIONS

EP Search Report issued on Oct. 11, 2016 in corresponding European Patent Application No. 14759726.4.
First Office Action dated Jul. 3, 2017 in corresponding Chinese Patent Application No.: 2017062801950430.

ANTENNA SHARING DEVICE FOR WIRELESS ACCESS NODE SYSTEMS IN WIRELESS COMMUNICATION NETWORK

CROSS REFERENCE TO RELATED APPLICATIONS

This application is a continuation of International Application No. PCT/KR2014/001763 filed on Mar. 4, 2014, which claims priority to Korean Application No. 10-2013-0022719 filed on Mar. 4, 2013, and Korean Application No. 10-2013-0046906 filed on Apr. 26, 2013, which applications are incorporated herein by reference.

TECHNICAL FIELD

The present invention relates to a wireless access node system, such as a base station, a relay station, and a small base station, in a wireless communication network (Personal Communication Services (PCS), cellular, Code Division Multiple Access (CDMA), Global System/Standard for Mobile Communication (GSM), and Long-Term Evolution (LTE)), and more particularly, to a device appropriate to share an antenna for wireless access node systems of a plurality of business operators to which Multiple Input Multiple Output (MIMO) technology is applied.

BACKGROUND ART

Recently, as wireless communication services have been generalized, and wireless broadband data communication has been activated, various frequency bands become available frequency bands in order to sufficiently secure insufficient frequency bands. A mainly used frequency band is a band of 800 MHz or 900 MHz (for example, 698 to 940 MHz, hereinafter, referred to as "a first frequency band") that is a relatively low frequency band, a band of 1.8 GHz or 2.1 GHz (for example, 1.71 to 2.17 GHz, hereinafter, referred to as "a second frequency band") that is a relatively high frequency band, and a band of 2.3 GHz (for example, 2.3 to 2.7 GHz, hereinafter, referred to as "a third frequency band") that is a relatively high frequency band. The first, second, and third frequency bands are appropriately distributed and allocated to communication schemes according to second generation (2G, for example, CDMA), third generation (3G, for example, WCDMA), and fourth generation (4G, for example, LTE) wireless access technologies (Radio Access Technology (RAT)), respectively. Further, the MIMO technology based on multiple antennas is an essential technology in improving a data transmission speed, and has been applied to a recent wireless communication network, such as LTE and Mobile WiMAX.

FIG. 1 is a block diagram illustrating an example of wireless access node systems for each of a plurality of business operators representing a general antenna installation state, and illustrates, for example, a base station system A 10 and a base station system B 20 which are wireless communication base stations of business operators A and B. In this case, the base station system A 10 and the base station system B 20 may be general wireless communication base stations taking charge of a relatively wide area, but in the example of FIG. 1, the base station system A 10 and the base station system B 20 are installed in each floor of a building, such that the base station system A 10 and the base station system B 20 correspond to a relay station or a small base station installed in a specific shadow area 1.

Referring to FIG. 1, each of the base station system A 10 and the base station system B 20 may include, for example, communication equipment of the first to third bands. In this case, sub bands are differently allocated for each of the business operators in each of the first to third bands, so that the base station system A 10 includes transceiving units 1-A, 2-A, and 3-A, 110, 120, and 130 for processing transceiving signals of bands 1-A, 2-A, and 3-A. Similarly, the base station system B 20 includes transceiving units 1-B, 2-B, and 3-B 210, 220, and 230 for processing transceiving signals of bands 1-B, 2-B, and 3-B. For example, the band 1-A may be set to have a transmission band of 824 to 839 MHz, and a reception band of 869 to 884 MHz, and the band 1-B may be set to have a transmission band of 839 to 849 MHz, and a reception band of 884 to 894 MHz.

A transmission signal of each of the different bands processed by the transceiving units 1-A, 2-A, and 3-A 110, 120, and 130 of the base station system A 10 is coupled by a filter coupler 140 and transmitted to one or more base station antennas A 12 installed in the shadow area 1 (for example, a specific layer of a building), and the signals received by the antenna 12 are distributed for each frequency by the filter coupler 140 and provided to the transceiving units 1-A, 2-A, and 3-A 110, 120, and 130, respectively. Similarly, the base station system B 20 also includes a filter coupler 240 for distributing and coupling transmission and reception signals between the transceiving units 1-B, 2-B, and 3-B 210, 220, and 230 and one or more base station antennas B 22 installed in the shadow area 1.

The filter couplers 140 and 240 of the base station systems A and B 10 and 20 are implemented in a filter coupled structure similar to a structure of a duplexer and a multiplexer for no-loss coupling and distributing the transmission and reception signals. In this case, each of the filter couplers 140 and 240 serves as a distributor as it is without a change of a structure thereof when a signal input/output direction is simply changed, and it may be understood that a term "coupler" actually means a "coupler/distributor". An example of a technology for a filter coupler is Korean Patent Application Publication No. 10-2008-0114104 previously filed by the applicant of the present application (title: "Filter Combiner/Divider", inventors: PARK, Sang-Sik and YANG, Myeong-Hoon, publication date: Dec. 31, 2008).

In the meantime, the structure illustrated in FIG. 1 is the example implemented by a 1Transfer 1Receive (1T1R) scheme, not the MIMO scheme. That is, for example, only a first transception path (path1) P1 is connected with the filter coupler 140 in the transceiving units 1-A, 2-A, and 3-A 110, 120, and 130 of the base station system A 10. In the structure, when the MIMO scheme, such as a 2Transfer 2Receive (2T2R), is implemented, an additional filter coupler and additional antennas are provided for processing a transmission/reception signal for a second transceiving path P2 of the transceiving units 1-A, 2-A, and 3-A 110, 120, and 130 of the base station system A 10.

As illustrated in FIG. 1, in a general wireless communication system, a plurality of business operators generally provide services, and the business operators individually install the independent base station systems 10 and 20 and the antennas 12 and 22 to provide the services, respectively. Accordingly, there are problems in that a wave quality is degraded due to mutual interference of the base stations separately installed for each business operator and investment is repeated and excessive. Particularly, a cost for installing the plurality of antennas for each business operator is increased, and there is a large problem in securing a space for actually installing an antenna and efficiency of a management of the antenna.

Further, recently, a demand for supporting MIMO in various frequency bands has risen, and to this end, when antennas are installed for each business operator, the aforementioned problem becomes more severe.

SUMMARY

Therefore, the present invention has been made in view of the above-mentioned problems, and an aspect of the present invention is to provide an apparatus for sharing antennas in wireless access node systems, which is appropriate when a MIMO-scheme system is established, and enables antennas of wireless access node systems to be shared and used by each of the plurality of business operators.

In accordance with an aspect of the present invention, there is provided an apparatus for sharing antennas of wireless access node systems in a wireless communication network including a wireless access node system A and a wireless access node system B, each of which includes one or more transceiving units for processing transmission/reception signals of one or more frequency bands, the apparatus including: a Multiple Input Multiple Output (MIMO) coupler A that connects a signal of a first transceiving path among MIMO paths of the one or more transceiving units of the wireless access node system A and a signal of a second transceiving path among MIMO paths of the one or more transceiving units of the wireless access node system B with an antenna of the wireless access node system A; and a MIMO coupler B that connects a signal of a first transceiving path among the MIMO paths of the one or more transceiving units of the wireless access node system B and a signal of a second transceiving path among the MIMO paths of the one or more transceiving units of the wireless access node system A with an antenna of the wireless access node system B.

The MIMO coupler A may include a directional coupler module A, which has a broadband characteristic capable of processing all of signal processing bands of the wireless access node systems A and B, allows the transmission signal of the first transceiving path of the wireless access node system A to pass therethrough with a total-reflection characteristic, and allows the transmission signal of the second transceiving path of the wireless access node system B to pass therethrough, couples both signals, and outputs the synthesized signal to the antenna of the wireless access node system A, and the MIMO coupler B includes a directional coupler module B, which has a broadband characteristic capable of processing all of signal processing bands of the wireless access node systems A and B, allows the transmission signal of the first transceiving path of the wireless access node system B to pass therethrough with a total-reflection characteristic, allows the transmission signal of the second transceiving path of the wireless access node system A to pass therethrough, couples both signals, and outputs the synthesized signal to the antenna of the wireless access node system B.

The directional coupler module A may include first and second directional couplers of a broadband, and upper and lower Band Pass Filters (BPFs) having a filtering characteristic of a signal band of the second transceiving path of the wireless access node system B installed in signal paths between the first and second directional couplers, respectively, and the directional coupler module B may include first and second directional couplers of a broadband, and upper and lower BPFs having a filtering characteristic of a signal band of the second transceiving path of the wireless access node system A installed in signal paths between the first and second directional couplers, respectively.

The directional coupler module may be configured by using a broadband hybrid coupler.

The wireless access node system A may include at least transceiving units 1-A and 2-A for processing transceiving signals of at least bands 1-A and 2-A and a first path filter coupler coupling and distributing a signal of a first transceiving path of the MIMO paths of the transceiving units 1-A and 2-A, and provides a signal of a second transceiving path of the MIMO paths of any one of the transceiving units 1-A and 2-A to the outside, and the wireless access node system B may include at least transceiving units 1-B and 2-B for processing transceiving signals of at least bands 1-B and 2-B and a filter coupler coupling and distributing a signal of a first transceiving path of the MIMO paths of the transceiving units 1-B and 2-B, and provides a signal of a second transceiving path of the MIMO paths of any one of the transceiving units 1-B and 2-B to the outside.

The wireless access node system A may provide the signal of the second transceiving path among the MIMO paths of the transceiving unit 1-A to the outside, and provide the signal of the second transceiving path among the MIMO paths of the transceiving unit 1-B to the outside, and the upper and lower BPFs of the directional coupler module A may have a filtering characteristic of a signal band of the transceiving unit 1-B, and the upper and lower BPFs of the directional coupler module B may have a filtering characteristic of a signal band of the transceiving unit 1-A.

The wireless access node system A may include a second path filter coupler distributing and coupling signals of the second transceiving paths among the MIMO paths of the transceiving units 1-A and 2-A provided therein, and the wireless access node system B may include a second path filter coupler distributing and coupling signals of the second transceiving paths among the MIMO paths of the transceiving units 1-B and 2-B provided therein, and the upper and lower BPFs of the directional coupler module A may have a filtering characteristic of a signal band provided by the second path filter coupler of the wireless access node system A, and the upper and lower BPFs of the directional coupler module B may have a filtering characteristic of a signal band provided by the second path filter coupler of the wireless access node system.

In accordance with another aspect of the present invention, there is provided a n apparatus for sharing antennas of wireless access node systems in a wireless communication network including wireless access node system A and wireless access node system B, each of which includes one or more transceiving units for processing transmission/reception signals of one or more frequency bands, the apparatus including: a directional coupler module A that allows a transmission signal provided through a first transceiving path among Multiple Input Multiple Output (MIMO) paths of the one or more transceiving units of the wireless access node system A to pass therethrough with a total-reflection characteristic, allows a transmission signal of a second transceiving path among MIMO paths of the one or more transceiving units of the wireless access node system B to pass therethrough, synthesizes both signals, and outputs the synthesized signal to an antenna of the wireless access node system A; and a MIMO coupler A including a reception signal processing circuit providing a part of the reception signals of the antenna of the wireless access node system A through the second transceiving path of the wireless access node system B.

The directional coupler module A may have a broadband characteristic capable of processing entire signal processing bands of the wireless access node systems A and B, and include first and second directional couplers of a broadband, and upper and lower transmission Band Pass Filters (BPFs) having a filtering characteristic of a transmission signal band of the second transmission path of the wireless access node system B installed in signal paths between the first and second directional couplers.

The apparatus may further include: a BPF that divides signals of the first transceiving path into a signal of a predetermined first frequency band and a signal of another band, other than the first frequency band, and provides the signal of the first frequency band to the directional coupler module A; a lower first BPF that commonly receives a transmission signal with the wireless access node system A and the BPF, filters the signal of the first frequency band, and provides the filtered signal to the directional coupler module A; and an upper first BPF that commonly receives a reception signal with the antenna of the wireless access node system A and the BPF, filters the signal of the first frequency band, and provides the filtered signal to the directional coupler module A, and the directional coupler module A receives the transmission signal provided through the first transceiving path of the wireless access node system A through the lower first BPF, and the signal output to the antenna of the wireless access node system A is output through the upper first BPF.

The reception signal processing circuit may include: a coupler that couples and outputs a part of reception signals of the antenna of the wireless access node system A; and a duplexer that is installed in a connection path between the directional coupler module A and the wireless access node system B, and couples the reception signal provided from the coupler and the transmission signal transmitted by the wireless access node system B, and divides the reception signal provided from the coupler from the transmission signal transmitted by the wireless access node system B.

The reception signal processing circuit may include: a coupler that couples and outputs a part of reception signals of the antenna of the wireless access node system A; a first reception BPF that filters and outputs the reception signal provided from the coupler according to a predetermined reception signal band; and an isolator that provides the signal output from the first reception BPF to the directional coupler module A, and the directional coupler module A may receive the reception signal provided through the isolator, totally reflect the received signal, and transmit the totally reflected signal to the wireless access node system B.

The reception signal processing circuit may include: an attenuator that attenuates the reception signal provided by the wireless access node system A; and a duplexer that is installed in a connection path between the directional coupler module A and the wireless access node system B, and couples the reception signal provided from the attenuator and the transmission signal transmitted by the wireless access node system B, and divides the reception signal provided from the attenuator from the transmission signal transmitted by the wireless access node system B.

The reception signal processing circuit may include: an attenuator that attenuates the reception signal provided by the wireless access node system A; a first reception BPF that filters and outputs the reception signal provided from the attenuator according to a predetermined reception signal band; and an isolator that provides the signal output from the first reception BPF to the directional coupler module A, and the directional coupler module A receives the reception signal provided through the isolator, totally reflects the received signal, and transmits the totally reflected signal to the wireless access node system B.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
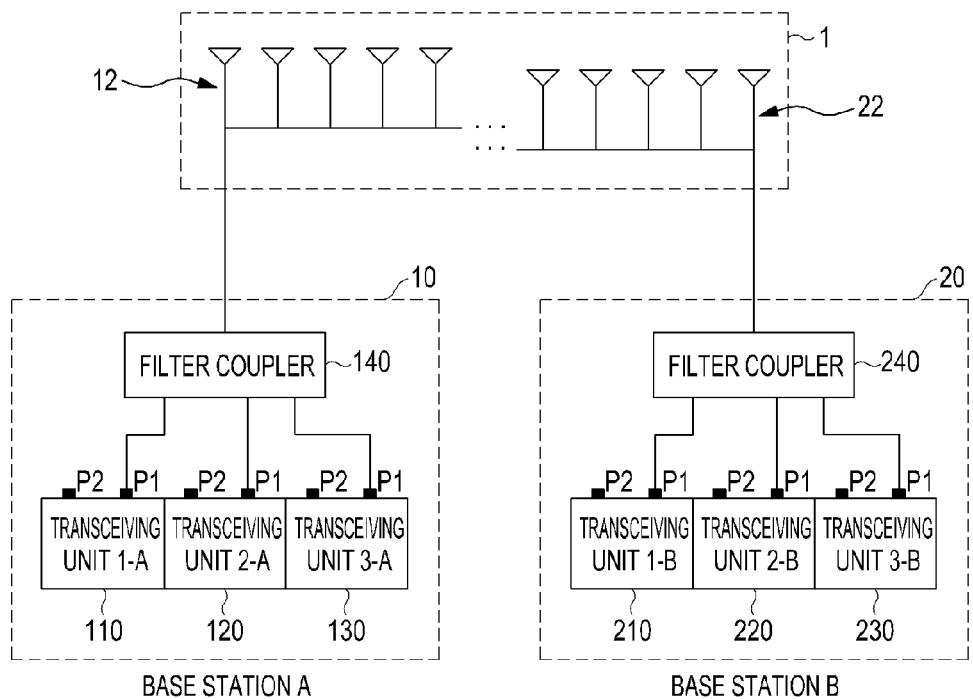
FIG. 1 is a block diagram illustrating an example of wireless access node systems for each of a plurality of business operators representing a general antenna installation state.

Hereinafter, exemplary embodiments of the present disclosure will be described in detail with reference to the accompanying drawings. Various specific definitions found in the following description are provided only to help general understanding of the present invention, and it is apparent to those skilled in the art that the present invention can be implemented without such definitions. Further, in the accompanying drawings and the following description, identical elements are provided with the same reference numeral where possible.

Figure 2:
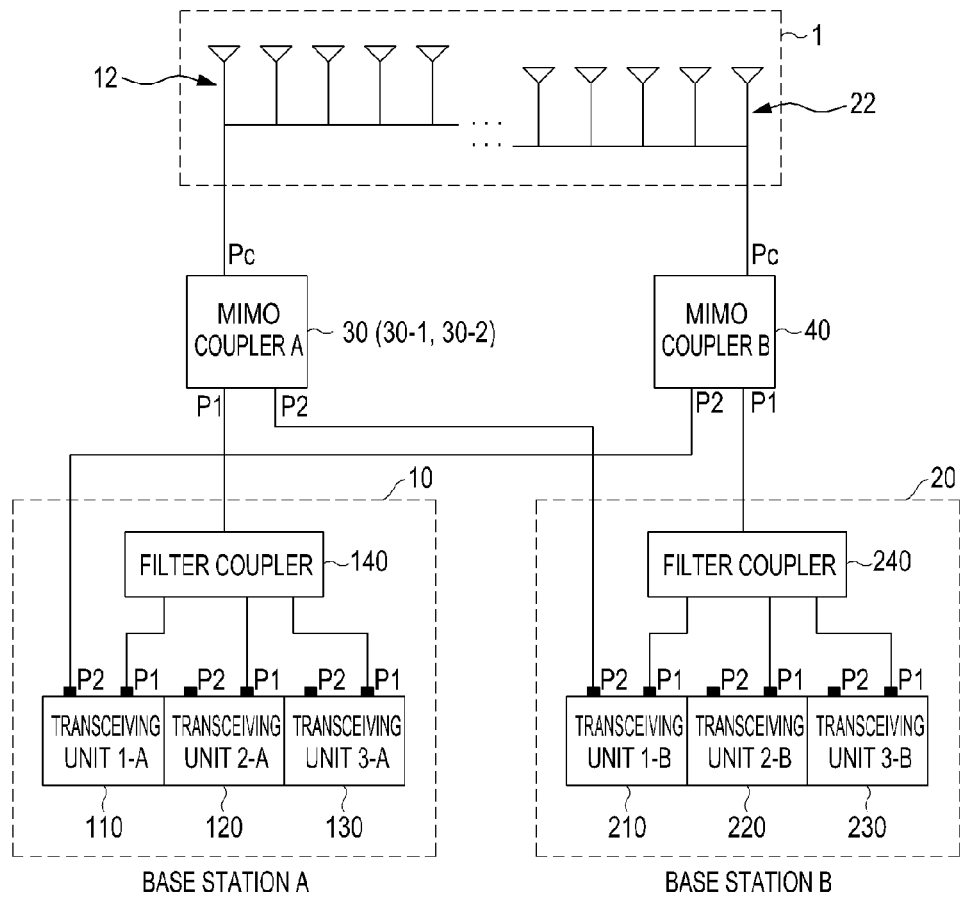
FIG. 2 is a block diagram for an apparatus for sharing antennas of wireless access node systems and related devices according to a first exemplary embodiment of the present invention.

FIG. 2 is a block diagram for an apparatus for sharing antennas of wireless access node systems and related devices according to a first exemplary embodiment of the present invention, similar to the example of the related art illustrated in FIG. 1, and FIG. 2 illustrates a base station system A 10 and a base station system B 20 corresponding to wireless communication base stations of business operators A and B. Referring to FIG. 2, similar to the related art, each of the base station system A 10 and the base station system B 20 may include, for example, communication equipment of the first to third bands. For example, the base station system A 10 includes 1-A, 2-A, and 3-A transceiving units 110, 120, and 130 for processing transmission/reception signals of bands 1-A, 2-A, and 3-A, and the base station system B 20 includes transceiving units 1-B, 2-B, and 3-B 210, 220, and 230 for processing transmission/reception signals of bands 1-B, 2-B, and 3-B.

In the structure, the base station system A 10 and the base station system B 20 are implemented by, for example, a Multiple Input Multiple Output (MIMO) system of 2Transfer 2Receive (2T2R), and antennas required to be additionally provided to this end have structures for sharing and utilizing the antennas of the other business operators (that is, the other base stations) with each other according to the characteristic of the present invention.

In more detail, a transmission signal processed in the transceiving units 1-A, 2-A, and 3-A 110, 120, and 130 of the base station system A 10 through a first transceiving path P1 among MIMO paths is coupled by a filter coupler 140 and transmitted to one or more base station antennas A 12 installed in a shadow area 1 similar to the related art, and in this case, the transmission signal is transmitted to the antenna 12 through a MIMO coupler A 30 installed according to the characteristic of the present invention. Similarly, a transmission signal processed in the transceiving units 1-B, 2-B, and 3-B 210, 220, and 230 of the base station system B 20 through the first transceiving path P1 among the MIMO paths is coupled by a filter coupler 240 and transmitted to one or more base station antennas B 22 installed in the shadow area 1 through a MIMO coupler B 40 installed according to the characteristic of the present invention.

Further, a transmission signal through a second transceiving path P2 among the MIMO paths of a transceiving unit, that is, the transceiving unit 1-A 110 in the example of FIG. 2, of at least one band of the base station system A 10, is provided to the MIMO coupler B 40, and a transmission signal through the second transceiving path P2 among the MIMO paths of a transceiving unit, that is, the transceiving unit 1-B 210 in the example of FIG. 2, of at least one band of the base station system B 20, is provided to the MIMO coupler A 30.

The MIMO coupler A 30 couples the transmission signal transmitted from the base station system B 20 through the second transceiving path P2 among the MIMO paths with the transmission signal of the base station system A 10 and transmits the coupled transmission signal to the base station antenna A 12. Similarly, the MIMO coupler B 40 couples the transmission signal transmitted from the base station system A 10 through the second transceiving path P2 among the MIMO paths with the transmission signal of the base station system B 20 and transmits the coupled transmission signal to the base station antenna B 22.

A reception operation is performed by a reverse process of the transmission operation. That is, the MIMO coupler A 30 distributes a signal of a band allocated to the base station system A 10 among the signals received by the base station antenna A 12 and provides the signal to the filter coupler 140 of the base station A, and distributes a signal of a band allocated to the base station system B 20 among the signals received by the base station antenna A 12 and finally provides the signal to the second transception path of the transceiving unit 1-B 210 of the base station system B 20. The filter coupler 140 of the base station system A 10 distributes the reception signals for each frequency band and provides the distributed signals to the corresponding the transceiving units 1-A, 2-A, and 3-A 110, 120, and 130, respectively. Similarly, the MIMO coupler B 40 distributes a signal of a band allocated to the base station system B 20 among the signals received by the base station antenna B 22 and provides the signal to the filter coupler 240 of the base station B, and distributes a signal of a band allocated to the base station system A 10 among the signals received by the base station antenna B 22 to the base station system A 10.

Figure 3:
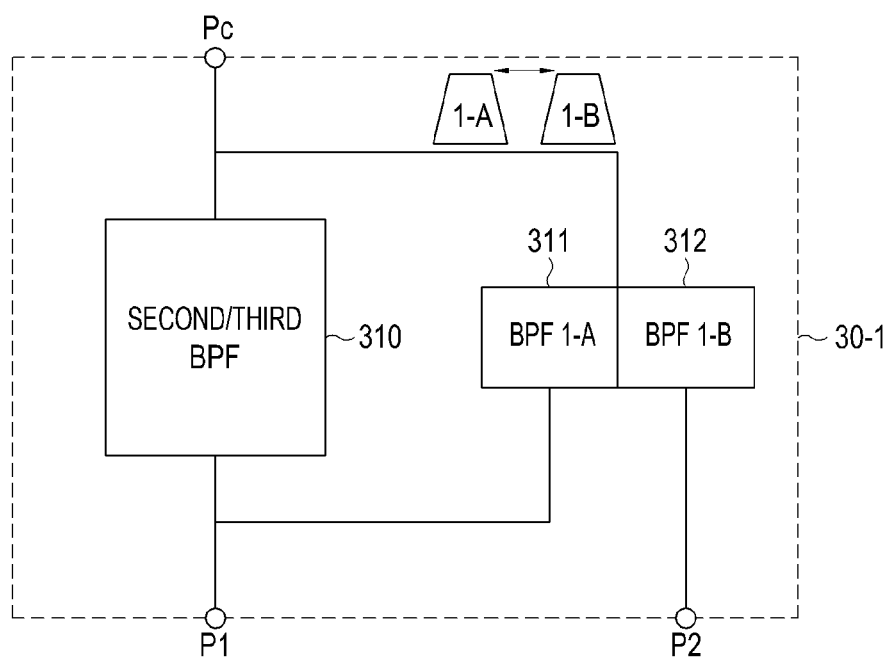
FIG. 3 is a block diagram for one structure example considerable for performing an operation corresponding to an MIMO coupler in FIG. 2.

FIG. 3 is a block diagram for one structure example considerable for performing an operation corresponding to an MIMO coupler in FIG. 2, and for example, an action corresponding to the MIMO coupler A 30 of FIG. 2 may be performed. A MIMO coupler 30-1 illustrated in FIG. 3 may be configured based on a structure of the filter coupler including filter units corresponding to frequency bands of passing signals, respectively.

In more detail, the MIMO coupler 30-1 includes a second/third Band Pass Filter (BPF) 310 and a BPF 1-A 311 for filtering a signal of the second/third frequency band (for example, the band of 1.8 GHz and a band of 2 GHz) of the base station system A 10 and a signal of the first frequency band (for example, a frequency band 1-A in the band of 800 MHz) of the base station system A 10, respectively, and a BPF 1-B 312 for filtering a signal of the first frequency band (for example, a frequency band 1-B in the band of 800 MHz) of the base station system B 20. Further, the MIMO coupler 30-1 is configured so that the signal transmitted by the base station system A 10 is distributed and input into the second/third BPF 310 and the BPF 1-A 311, and the signal transmitted by the base station system B 20 is input into the BPF 1-B 312. The MIMO coupler 30-1 is configured so that the transmission signals passing through the second/third BPF 310, the BPF 1-A 311, and the BPF 1-B 312 are synthesized and output to the base station antenna A 12. Through the configuration, in a reverse process, the reception signals are distributed by the second/third BPF 310, the BPF 1-A 311, and the BPF 1-B 312, and the signals passing through the second/third BPF 310 and the BPF 1-A 311 are synthesized again and provided to the base station system A 10, and the signal passing through the BPF 1-B 312 is provided to the base station system B 20.

The MIMO coupler 30-1 performing the action corresponding to the MIMO coupler A 30 of FIG. 2 may be configured as described above, and a MIMO coupler performing an action corresponding to the MIMO coupler B 40 of FIG. 2 may also be implemented by using the configuration principle.

However, when a currently usable actual product is implemented, the configuration illustrated in FIG. 3 may be implemented only when the band 1-A and the band 1-B are relatively considerably spaced apart from each other. That is, a current frequency allocation band for each business operator is allocated so that there is no guard band between the frequency allocation bands. For example, the transmission band of the band 1-A may be set to 824 to 839 MHz and the transmission band of the band 1-B may be set to 839 to 849 MHz, and each business operator maximally utilizes an available frequency band, so that, even with maximum consideration, a guard band of a maximum of about 1 MHz exists between the band 1-A and the band 1-B.

However, it is very difficult to implement the BPF 1-A 311 and the BPF 1-B 312 so that the frequency band is precisely filtered when a typical wireless frequency filter is designed by current technology, and when the filter having the aforementioned characteristic is implemented, considerable complexity and high costs are required. Accordingly, it is not relatively preferable to implement the MIMO coupler with the configuration illustrated in FIG. 3 at present.

Figure 4:
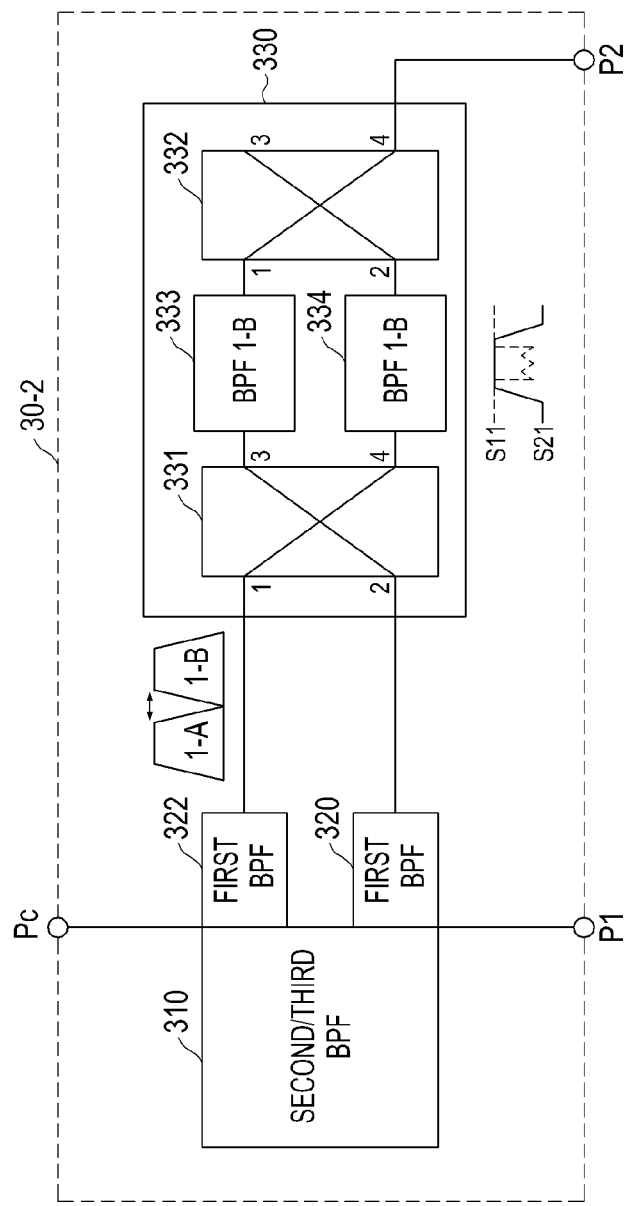
FIG. 4 is a detailed block diagram for another structure example considerable for performing an operation corresponding to an MIMO coupler in FIG. 2.

FIG. 4 is a block diagram for another structure example considerable for performing an operation corresponding to an MIMO coupler in FIG. 2, and for example, an action corresponding to the MIMO coupler A 30 of FIG. 2 may be performed. The MIMO coupler 30-2 illustrated in FIG. 4 represents a configuration, in which the problem in the actual implementation of the MIMO coupler 30-1 illustrated in FIG. 3 is somewhat solved.

Referring to FIG. 4, the MIMO coupler 30-2 includes a second/third BPF 310 for filtering a signal of a different band other than the first frequency band, that is, the signal of the second/third frequency band, a lower first BPF 320 and an upper first BPF 322 for filtering the signals of the first frequency band (that is, the band including all of the frequency bands 1-A and 1-B), and a directional coupler module 330 having a characteristic of allowing the signal of the frequency band 1-B in the first frequency band to pass therethrough.

Further, the MIMO coupler 30-2 is configured so that the signal transmitted by the base station system A 10 is distributed and input into the second/third BPF 310 and the lower first BPF 320, and the signal received by the base station antenna A 12 is distributed and input into the second/third BPF 310 and the upper first BPF 322.

Further, the directional coupler module 330 is configured to be connected with the lower and upper first BPFs 320 and 322 through input/output ports, respectively, and be connected with the base station system B 20 with another input/output port. In this case, the directional coupler module 330 is configured to totally reflect the transmission signal of the base station system A 10 input through the lower first BPF 320, allow the transmission signal of the base station system B 20 to pass therethrough, and synthesize both signals to output the synthesized signal to the upper first BPF 322. Accordingly, when the first frequency band signal among the reception signals received by the base station antenna A 12 is input into the directional coupler module 330 through the upper first BPF 322, the directional coupler module 330 divides the first frequency band signal into signals of the frequency bands 1-A and 1-B, totally reflects the reception signal of the frequency band 1-A and outputs the totally reflected reception signal to the lower first BPF 320, allows the reception signal of the frequency band 1-B to pass therethrough, and outputs the passing reception signal to the base station system B 20.

The configuration of the directional coupler module 330 will be described in more detail. The directional coupler module 330 includes first and second directional couplers 331 and 332 processing the signals of the first frequency band, respectively, and upper and lower BPFs 1-B 333 and 334 of the frequency band 1-B installed in the signal paths between the first and second directional couplers 331 and 332, respectively.

The signals input into a number one terminal or a number two terminal have a predetermined phase difference (for example, 90 degrees), and each of the first and second directional couplers 331 and 332 distributes and outputs the signal input into the number one terminal or the number two terminal to a number three terminal and a number four terminal, respectively. Reversely, the first and second directional couplers 331 and 332 synthesize the signals input into the number three terminal and the number four terminal according to phase differences and output the synthesized signal to the number one terminals or the number two terminals. In this case, the number one terminal of the first directional coupler 331 is connected with the upper first BPF 322, and the number two terminal of the first directional coupler 331 is connected with the lower first BPF 320. The number four terminal of the second directional coupler 332 is connected with the base station system B 20. Further, the number three terminal of the first directional coupler 331 is connected with the number one terminal of the second direction coupler 332 through the upper BPF 1-B 333, and the number four terminal of the first directional coupler 331 is connected with the number two terminal of the second direction coupler 332 through the lower BPF 1-B 334.

The signals input into the number two terminal of the first directional coupler 331 through the lower first BPF 320 have predetermined phase differences from each other and are distributed and output to the number three terminal and the number four terminal, and the frequency band of the corresponding distributed signals is the frequency band 1-A, so that the distributed signals are totally reflected by the upper and lower BPFs 1-B 333 and 334 and re-input into the number three terminal and the number four terminal. The signals re-input into the number three terminal and the number four terminal have a predetermined phase difference (for example, 90 degrees), so that the signals are finally synthesized and output to the number one terminal. In the meantime, the signals input into the number four terminal of the second directional coupler 332 have a predetermined phase difference from each other (for example, 90 degrees) and are distributed and output to the number one terminal and the number two terminal, and the frequency band of the corresponding distributed signals is the frequency band 1-B, so that the distributed signals pass through the upper and lower BPFs 1-B 333 and 334 and are input into the number three terminal and the number four terminal of the first directional coupler 331, and are finally synthesized and output to the number one terminal of the first directional coupler 331.

The MIMO coupler 30-2 having another structure and performing the action corresponding to the MIMO coupler A 30 of FIG. 2 may be configured as described above, and a MIMO coupler performing an action corresponding to the MIMO coupler B 40 of FIG. 2 may also be implemented by using the configuration principle.

However, the configuration illustrated in FIG. 4 may be easily manufactured when a product is implemented compared to the configuration illustrated in FIG. 3, but still is somewhat complex, in that the requirement of the filter structure in which the second/third BPF 310 and the lower and upper first BPFs 320 and 322 are combined, and a relatively large number of elements needs to be provided.

Figure 5:
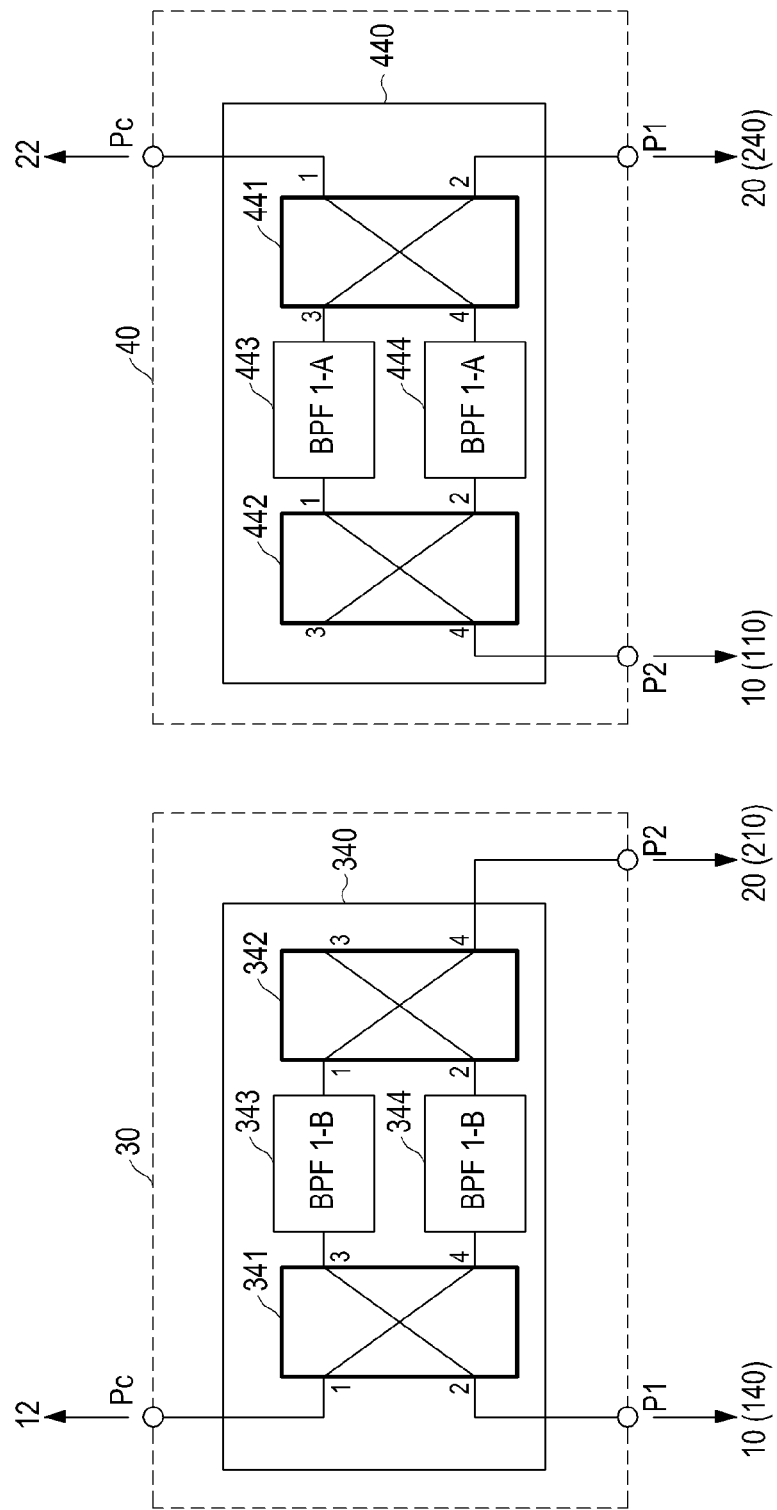
FIG. 5 is a detailed block diagram of the MIMO couplers of FIG. 2.

FIG. 5 is a detailed block diagram of the MIMO couplers, that is, the MIMO coupler A 30 and the MIMO coupler B 40, of FIG. 2. The MIMO coupler A 30 and the MIMO coupler B 40 illustrated in FIG. 5 represent configurations, in which the problem in the implementation of the MIMO coupler 30-2 illustrated in FIG. 4 is somewhat solved.

Referring to FIG. 5, it can be seen that the MIMO coupler A 30 and the MIMO coupler B 40 are implemented as directional coupler modules, that is, directional coupler modules A and B 340 and 440, respectively. The directional coupler module 330 illustrated in FIG. 4 is designed so as to process the signal of the first frequency band (for example, the band of 800 MHz), but the directional coupler modules A and B 340 and 440 illustrated in FIG. 5 are designed to have a broadband characteristic capable of processing all of the signals of the first to third frequency bands, for example, the bands of 800 MHz, 1.8 GHz, and 2 GHZ.

The present exemplary embodiment has been described based on the bands of 800 MHz, 1.8 GHz, and 2 GHZ as an example, but those skilled in the art may sufficiently infer that the MIMO coupler may be designed so that the operation is performed with a band larger or smaller than the bands.

First, the directional coupler module A 340 will be described in more detail. The directional coupler module A 340 is configured to receive signals of all of the bands transmitted by the base station system A 10 through one input/output port, and connected to the base station system B 20 through another input/output port. In this case, the directional coupler module A 340 is configured to totally reflect the transmission signal of the base station system A 10, allows the transmission signal of the base station system B 20 to pass therethrough, synthesizes both signals, and outputs the synthesized signal to the base station antenna A 12. Accordingly, when the signal received by the base station antenna A 12 is input into the directional coupler module A 340, the directional coupler module A 340 divides the input signal into signals for base station frequency bands A and B, and totally reflects a reception signal of the base station frequency band A (the frequency bands 1-A, 2-A, and 3-A in the present exemplary embodiment) and outputs the totally reflected reception signal to the base station system A 10, and allows a reception signal of the base station frequency band B (the frequency band 1-B in the present exemplary embodiment) to pass therethrough and output the passing reception signal to the base station system B 20.

The configuration of the directional coupler module A 340 will be described in more detail. The directional coupler module A 340 includes first and second directional couplers 341 and 342 of a broadband processing the signals of the first to third frequency bands, respectively, and upper and lower BPFs 1-B 343 and 344 of the frequency band 1-B installed in signal paths between the first and second directional couplers 341 and 342, respectively.

The signals input into a number one terminal or a number two terminal have a predetermined phase difference (for example, 90 degrees), and each of the first and second directional couplers 341 and 342 distributes and outputs the signal input into a number three terminal and a number four terminal, respectively. Reversely, the first and second directional couplers 341 and 342 synthesize the signals input into the number three terminal and the number four terminal according to phase differences and output the synthesized signal to the number one terminals or the number two terminals. In this case, the number two terminal of the first directional coupler 341 is connected to the base station system A 10, and the number one terminal is connected to the base station antenna A 12. The number four terminal of the second directional coupler 342 is connected with the base station system B 20. Further, the number three terminal of the first directional coupler 341 is connected with the number one terminal of the second direction coupler 342 through the upper BPF 1-B 343, and the number four terminal of the first directional coupler 341 is connected with the number two terminal of the second direction coupler 342 through the lower BPF 1-B 344.

The signals input into the number two terminal of the first directional coupler 341 are distributed and output to the number three terminal and the number four terminal while having a predetermined phase difference (for example, 90 degrees) from each other, and the frequency bands of the corresponding distributed signals are the frequency bands 1-A, 2-A, and 3-A, so that the distributed signals are totally reflected by the upper and lower BPFs 1-B 343 and 344 and re-input into the number three terminal and the number four terminal. The signals re-input into the number three terminal and the number four terminal have a predetermined phase difference (for example, 90 degrees), so that the signals are finally synthesized and output to the number one terminal. In the meantime, the signals input into the number four terminal of the second directional coupler 342 have a predetermined phase difference (for example, 90 degrees) from each other and are distributed and output to the number one terminal and the number two terminal, and the frequency band of the corresponding distributed signals is the frequency band 1-B, so that the distributed signals pass through the upper and lower BPFs 1-B 343 and 344 and are input into the number three terminal and the number four terminal of the first directional coupler 341, and are finally synthesized and output to the number one terminal of the first directional coupler 341.

The first and second directional couplers 341 and 342 may be configured by a 3 dB broadband hybrid coupler. In this case, for example, the signals input into the number two terminal of the first and second directional couplers 341 and 342 are distributed and output to the number three terminal and the number four terminal, respectively, while having the phase difference of 90 degrees. In this case, for example, the signals input into the number two terminal of the first directional coupler 341 and distributed and output to the number three terminal and the number four terminal mutually have the phase difference of 90 degrees when being totally reflected by the upper and lower BPFs 1-B 343 and 344 and re-input into the number three terminal and the number four terminal, so that the signals are finally synthesized to each other and output to the number one terminal. Further, the number four terminal, which is not connected in another equipment in the second directional coupler 342, is terminated at 50Ω (Ohm).

Next, a principle of the detailed configuration of the directional coupler module B 440 is the same as that of the directional coupler module A 340 except that a signal of the base station A and a signal of the base station B are processed in an opposite manner.

That is, the directional coupler module B 440 includes first and second directional couplers 441 and 442 of a broadband processing the signals of the first to third frequency bands, respectively, and upper and lower BPFs 1-A 443 and 444 of the frequency band 1-A installed in signal paths between the first and second directional couplers 441 and 442, respectively.

The signals input into a number one terminal or a number two terminal have a predetermined phase difference (for example, 90 degrees), and each of the first and second directional couplers 441 and 442 distributes and outputs the signal input into the number one terminal or the number two terminal to a number three terminal and a number four terminal, respectively. Reversely, the first and second directional couplers 441 and 442 synthesize the signals input into the number three terminal and the number four terminal according to phase differences and output the synthesized signal to the number one terminal or the number two terminal. In this case, the number two terminal of the first directional coupler 441 is connected to the base station antenna B 22, and the number one terminal is connected to the base station system B 20. The number four terminal of the second directional coupler 442 is connected with the base station system A 10. Further, the number three terminal of the first directional coupler 441 is connected with the number one terminal of the second direction coupler 442 through the upper BPF 1-A 443, and the number four terminal of the first directional coupler 441 is connected with the number two terminal of the second direction coupler 442 through the lower BPF 1-A 444.

The configuration illustrated in FIG. 5 uses the broadband directional coupler, compared to the configuration illustrated in FIG. 4, but does not require the structure of the second/third BPF 310 and the lower and upper first BPFs 320 and 322 in the configuration of FIG. 4, so that the configuration illustrated in FIG. 5 is more simple and is generally implementable with a small size and low costs.

In the meantime, it has been described that the directional coupler modules A and B 340 and 440 process the reception signals, as well as the transmission signals of the base station system A and B 10 and 20, and in this case, it can be seen that the upper and lower BPFs 1-B 343 and 344 of the directional coupler module A 340 need to have a filter structure passing through all of the transmission and reception bands of the band 1-B, and similarly, the upper and lower BPFs 1-A 443 and 444 of the directional coupler module B 440 need to have a filter structure passing through all of the transmission and reception bands of the band 1-A. That is, each of the upper and lower BPFs 1-B 343 and 344 may have a structure, in which the pass filters of the transmission band and the reception band in the band 1-B are combined, and similarly, each of the upper and lower BPFs 1-A 443 and 444 may have a structure, in which the passing filters of the transmission band and the reception band in the band 1-A are combined. The aforementioned structure is demanded in a high performance transmission and reception filter, and may still have problems in a complex configuration, an installation space and manufacturing costs.

Accordingly, the upper and lower BPFs 1-B 343 and 344 may have a pass filter structure processing only the transmission band in the band 1-B, and similarly, each of the upper and lower BPFs 1-A 443 and 444 may have a pass filter structure processing only the transmission band in the band 1-A. In this case, the directional coupler module A 340 has the configuration which is capable of processing all of the transmission signal and the reception signal of the base station system A 10 but is not capable of processing the reception signal of the base station system B 20, and similarly, the directional coupler module B 440 has the configuration which allows the transmission signal and the reception signal of the base station system B 20 to pass therethrough, but is not capable of processing the reception signal of the base station system A 10. However, the aforementioned configuration may be sufficiently utilized when the antenna sharing system is implemented according to the 2T1R scheme.

In the meantime, in addition, in other exemplary embodiments of the present invention, when the directional coupler modules A and B 340 and 440 are configured so that the upper and lower BPFs 1-B 343 and 344 have the pass filter processing only the transmission band in the band 1-B, and the upper and lower BPFs 1-A 443 and 444 have the pass filter processing only the transmission band in the band 1-A, in order to process the reception signal of the base station system A or B 10 or 20 which cannot be processed by the directional coupler module A or B 340 or 440, a separate reception signal processing structure may be further included which will be described below.

Figure 6:
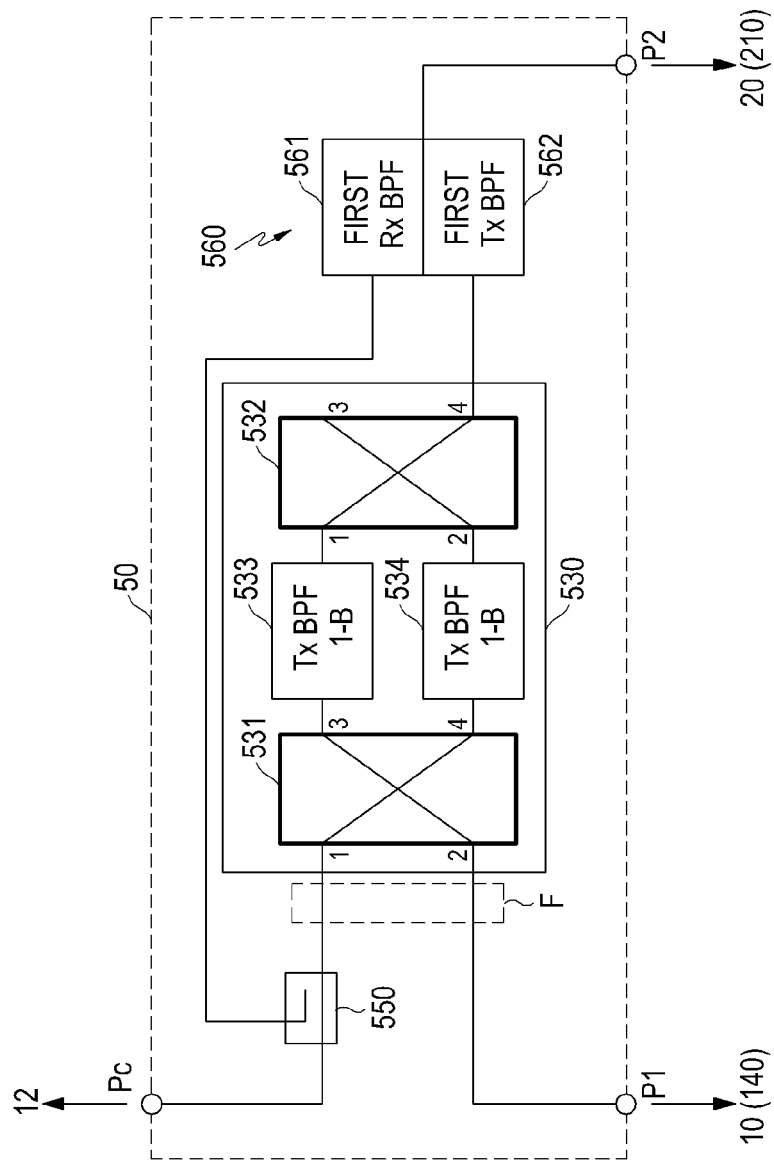
FIG. 6 is a detailed block diagram of a MIMO coupler in an apparatus for sharing antennas of wireless access node systems according to a second exemplary embodiment of the present invention.

FIG. 6 is a detailed block diagram of a MIMO coupler A 50 in an apparatus for sharing antennas of wireless access node systems according to a second exemplary embodiment of the present invention, and the MIMO coupler A 50 illustrated in FIG. 6 is applicable as a detailed structure of the MIMO coupler A 30 illustrated in FIG. 2. Referring to FIG. 6, the MIMO coupler A 50 according to the a second exemplary embodiment of the present invention has a similar structure to that of the directional coupler module A 340 illustrated in FIG. 5, but includes a directional coupler module A 530 allowing only a band of a transmission signal in the band 1-B to pass therethrough. Further, the MIMO coupler A 50 additionally includes: a coupler 550, which is installed in a connection path between the directional coupler module A 530 and the antenna 12, and couples a part of the reception signals input through a sharing port Pc and outputs the coupled signal by the antenna 12 in order to process a reception signal band 1-B, as a reception signal processing circuit for providing a reception signal of the antenna 12 of the base station system A 10 to the base station system B 20 through the second port P2; and a duplexer 560, which filters transmission and reception signals of the first band, is installed in a connection path between the directional coupler module A 530 and the base station system B 20, and filters the reception signal provided by the coupler 550 and transmits the filtered reception signal to the base station system B 20 through the second port P2, and filters the transmission signal transmitted by the base station system B 20 and provides the filtered signal to the directional coupler module A 530.

The duplexer 560 may have a filter combination structure including a first reception BPF 561 for filtering the reception signal provided by the coupler 550 and a first transmission BPF 562 for filtering the transmission signal transmitted by the base station system B 20. In this case, the first reception BPF 561 and the first transmission BPF 562 may also be designed to have filtering bands so as to correspond to the transmission and reception frequency bands 1-B, but may also be more simply set to have the first transmission and reception frequency bands. The reason is that because the duplexer 560 is used for combining the transmission/reception signals, the corresponding transceiving unit 1-B 210 of the base station system B 20 filters the transmission/reception signal according to the corresponding band.

The directional coupler module A 530 is designed to have a broadband characteristic capable of processing all of the signals of the first to third frequency bands, for example, the bands of 800 MHz, 1.8 GHz, and 2 GHz, similar to the example of FIG. 5. In more detail, the directional coupler module A 530 is configured to receive signals of all of the bands transmitted by the base station system A 10 through one input/output port (for example, a first port P1), and is connected with the base station system B 20 through another input/output port (for example, a second port P2) through the duplexer 560. In this case, the directional coupler module A 530 is configured to totally reflect the transmission signal of the base station system A 10, allows the transmission signal of the base station system B 20 to pass therethrough, synthesizes both signals, and outputs the synthesized signal to the base station antenna A 12 through the sharing port Pc. In this case, when the signal received by the base station antenna A 12 is input into the directional coupler module A 530 through the coupler 550, the directional coupler module A 530 totally reflects the signal and outputs the totally reflected signal to the base station system A 10.

The configuration of the directional coupler module A 530 will be described in more detail. The directional coupler module A 530 includes first and second directional couplers 531 and 532 of a broadband processing the signals of the first to third frequency bands, respectively, and upper and lower transmission BPF 1-Bs 533 and 534 of the frequency band 1-B installed in signal paths between the first and second directional couplers 531 and 532, respectively.

The signals input into a number one terminal or a number two terminal have a predetermined phase difference (for example, 90 degrees), and the first and second directional couplers 531 and 532 distribute and output the signal input into the number one terminal or the number two terminal to a number three terminal and a number four terminal, respectively. Reversely, the first and second directional couplers 531 and 532 synthesize the signals input into the number three terminal and the number four terminal according to phase differences and output the synthesized signal to the number one terminal or the number two terminal. In this case, the number two terminal of the first directional coupler 531 is connected to the base station system A 10, and the number one terminal is connected to the base station antenna A 12. The number four terminal of the second directional coupler 532 is connected with the base station system B 20. Further, the number three terminal of the first directional coupler 531 is connected with the number one terminal of the second direction coupler 532 through an upper transmission BPF 1-B 533, and the number four terminal of the first directional coupler 531 is connected with the number two terminal of the second direction coupler 532 through a lower transmission BPF 1-B 534.

The signals input into the number two terminal of the first directional coupler 531 are distributed and output to the number three terminal and the number four terminal while having a predetermined phase difference (for example, 990 degrees} from each other, and the frequency bands of the corresponding distributed signals are the frequency bands 1-A, 2-A, and 3-A, so that the distributed signals are totally reflected by the upper and lower transmission BPFs 1-B 533 and 534 and re-input into the number three terminal and the number four terminal. The signals re-input into the number three terminal and the number four terminal have a predetermined phase difference (for example, 90 degrees), so that the signals are synthesized and output to the number one terminal as a result. In the meantime, the signal input into the number four terminal of the second directional coupler 532 is distributed and output to the number one terminal and the number two terminal while having a predetermined phase difference (for example, 90 degrees), and the frequency band of the corresponding distributed signals is a transmission frequency band 1-B, so that the distributed signals pass through the upper and lower transmission BPFs 1-B 533 and 534 and are input into the number three terminal and the number four terminal of the first directional coupler 531, and are finally synthesized and output to the number one terminal of the first directional coupler 531.

The MIMO coupler A 50 according to the second exemplary embodiment of the present invention may be configured as described above, and a MIMO coupler B may be configured in a similar manner. A configuration and an operation principle of the MIMO coupler B is the same as those of the directional coupler module A 530 except that a signal of the base station A and a signal of the base station B are processed in an opposite manner.

Figure 7:
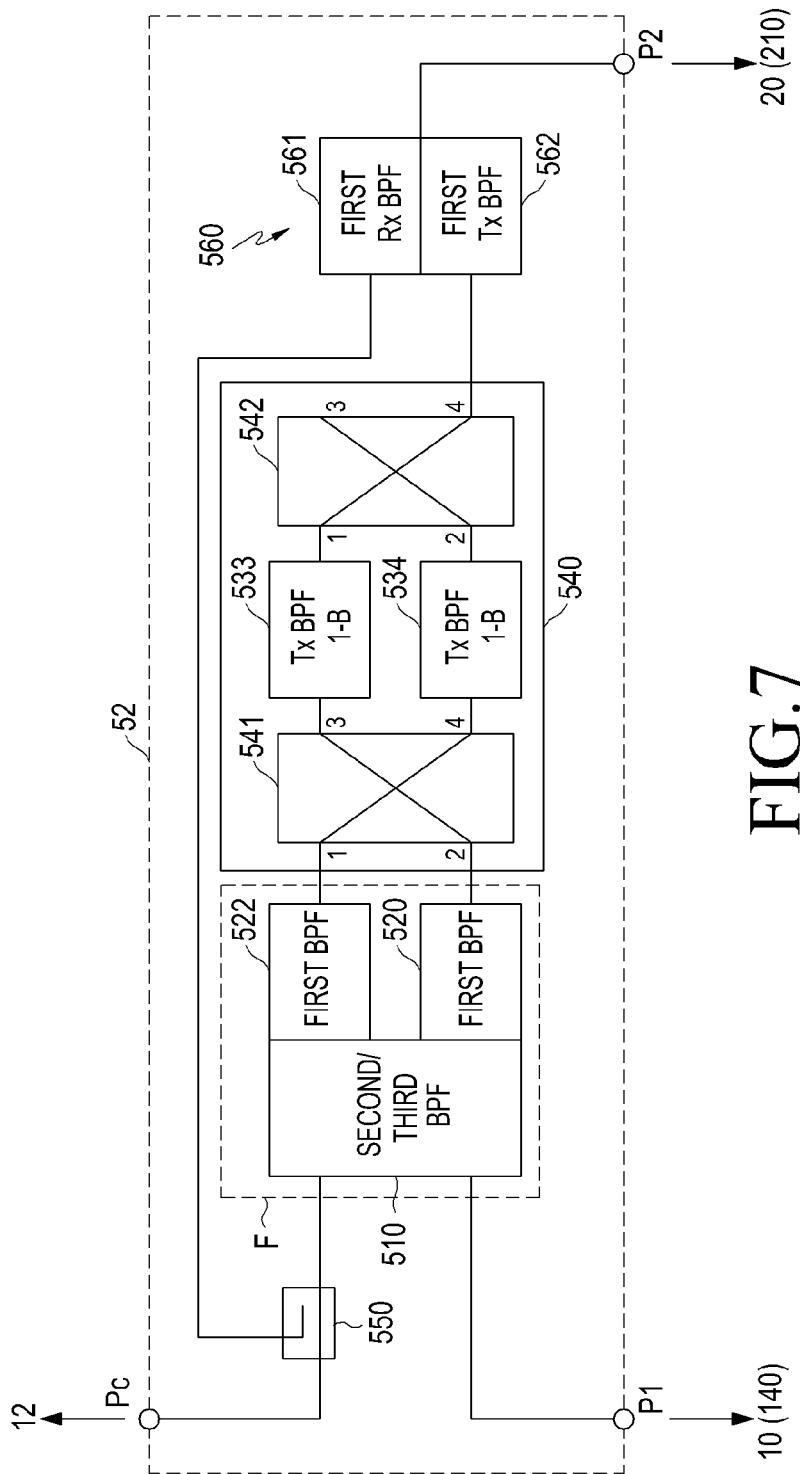
FIG. 7 is a diagram of a modified example of FIG. 6.

FIG. 7 is a diagram illustrating a modified example of FIG. 6, and illustrates a MIMO coupler A 52 having a structure slightly modified from the configuration of the MIMO coupler A 50 illustrated in FIG. 6. The MIMO coupler A 52 includes a directional coupler module A 540 similar to the example of FIG. 6, and differently from the directional coupler module A 530 illustrated in FIG. 6, the directional coupler module A 540 illustrated in FIG. 7 is designed to have a characteristic (of a relatively narrow band) capable of processing a signal of the first frequency band, for example, the band of 800 MHz, and thus first and second directional couplers 541 and 542 inside the directional coupler module A 540 are designed to have the characteristic of a narrow band. The structure may be slightly similar to the structure illustrated in FIG. 4, but is different from the structure illustrated in FIG. 4 in allowing only the transmission band of the band 1-B to pass therethrough.

Further, in the structure illustrated in FIG. 7, the directional coupler module A 540 is capable of processing a signal of the first frequency band, so that filter structures 510, 520, and 522 separating the second/third frequency band and the first frequency band and providing only the first frequency band to the directional coupler module A 540 are provided at a front end of the directional coupler module A, similar to the example illustrated in FIG. 4.

The filter structure will be described in more detail. The filter structure includes a second/third BPF 510 for filtering a signal of bands other than the first frequency band, that is, the signal of the second/third frequency band, and a lower first BPF 520 and an upper first BPF 522 filtering the signal of the first frequency band (that is, the band including all of the frequency bands 1-A and 1-B). Further, the signal transmitted by the base station system A 10 is distributed and input into the second/third BPF 510 and the lower first BPF 520, and the signal received by the base station antenna A 12 is distributed and input into the second/third BPF 510 and the upper first BPF 522 through the coupler 550.

Further, the directional coupler module 540 is configured be connected with the lower and upper first BPF 520 and 522 through input/output ports, respectively, and is connected with the base station system B 20 through another input/output port via the duplexer 560. In this case, the directional coupler module 540 is configured to totally reflect the transmission signal of the base station system A 10 input through the lower first BPF 520, allow the transmission signal of the base station system B 20 to pass therethrough, and synthesize both signals to output the synthesized signal to the upper first BPF 522. Accordingly, when a first frequency band signal among the reception signals received by the base station antenna A 12 is input into the directional coupler module A 540 through the upper first BPF 522, the directional coupler module 541 totally reflects the corresponding signal and outputs the totally reflected signal to the lower first BPF 520.

The MIMO coupler A 52 may be configured as illustrated in FIG. 7, and a MIMO coupler B may be configured with a similar configuration. A configuration and an operation principle of the MIMO coupler B is the same as those of the directional coupler module A 540 except that a signal of the base station A and a signal of the base station B are processed in an opposite manner.

Figure 8:
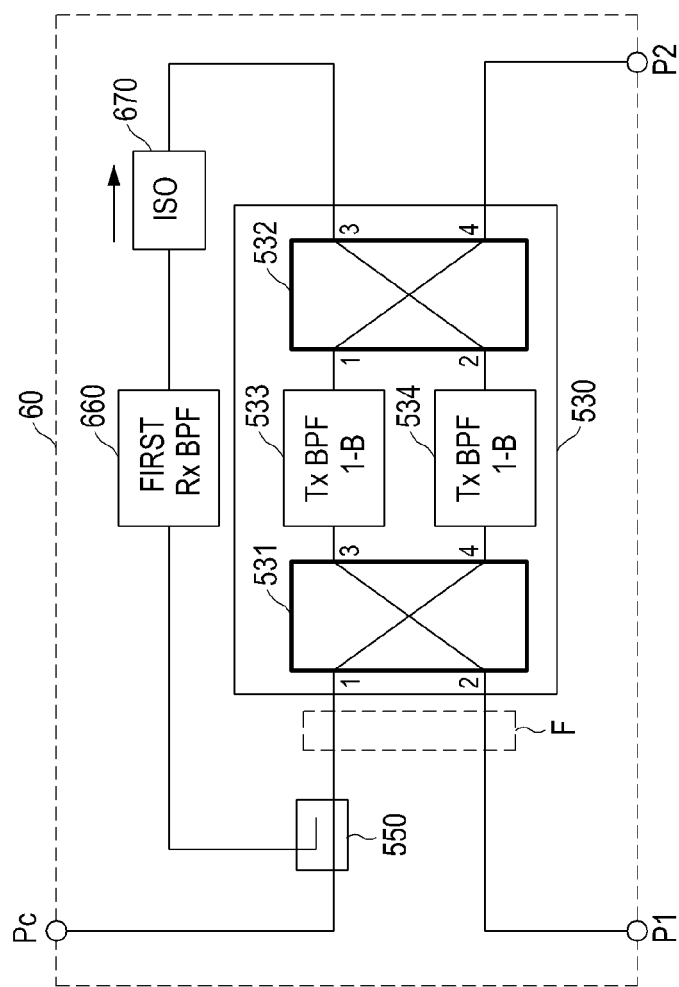
FIG. 8 is a detailed block diagram of a MIMO coupler in an apparatus for sharing antennas of wireless access node systems according to a third exemplary embodiment of the present invention.

FIG. 8 is a detailed block diagram of a MIMO coupler in an apparatus for sharing antennas of wireless access node systems according to a third exemplary embodiment of the present invention. A MIMO coupler A 60 illustrated in FIG. 8 is applicable as a detailed structure of the MIMO coupler A 30 illustrated in FIG. 2. Referring to FIG. 8, the MIMO coupler A 60 according to the third exemplary embodiment of the present invention includes: a directional coupler module A 530 having the same configuration as that of the directional coupler module A 530 illustrated in FIG. 6 to allow only a band of a transmission signal in the band 1-B to pass therethrough; a coupler 550 having the same configuration as that of the coupler illustrated in FIG. 6 to couple a part of reception signals input through a sharing port Pc and output by an antenna 12, a first reception BPF 660 filtering a reception signal of the first band from a reception signal provided from the coupler 550 and outputting the filtered signal; and an isolator 670 providing the signal output from the first reception BPF 660 to the directional coupler module A 530. In this case, the directional coupler module A 530 further includes a configuration for receiving the reception signal provided through the isolator 670, totally reflecting the received reception signal, and transmitting the totally reflected signal to the base station system B 20 through a second port P2. As described above, in the third exemplary embodiment, the coupler 550, the first reception BPF 660, and the isolator 670 are provided as reception signal processing circuits.

In more detail, the number four terminal of the second directional coupler module 532 in FIG. 6 is terminated at 50Ω, but in the exemplary embodiment of FIG. 8, the reception signal provided through the isolator 670 is input into a number three terminal of a second directional coupler 532 of the directional coupler module A 530. The signals input into the number three terminal of the second directional coupler 532 are distributed and output to a number one terminal and a number two terminal while having a predetermined phase difference (for example, 90 degrees) from each other, and a frequency band of the corresponding distributed signals is the first frequency band, so that the distributed signals are totally reflected by upper and lower transmission BPFs 1-B 533 and 534 and re-input into the number one terminal and the number two terminal. The signals re-input into the number one terminal and the number two terminal have a predetermined phase difference (for example, 90 degrees), so that the signals are synthesized and output to the number four terminal as a result.

The MIMO coupler A 60 according to the third exemplary embodiment of the present invention may be configured as described above, and a MIMO coupler B may be configured in the similar manner. A configuration and an operation principle of the MIMO coupler B is the same as those of the directional coupler module A 530 except that a signal of the base station A and a signal of the base station B are processed in an opposite manner.

Figure 9:
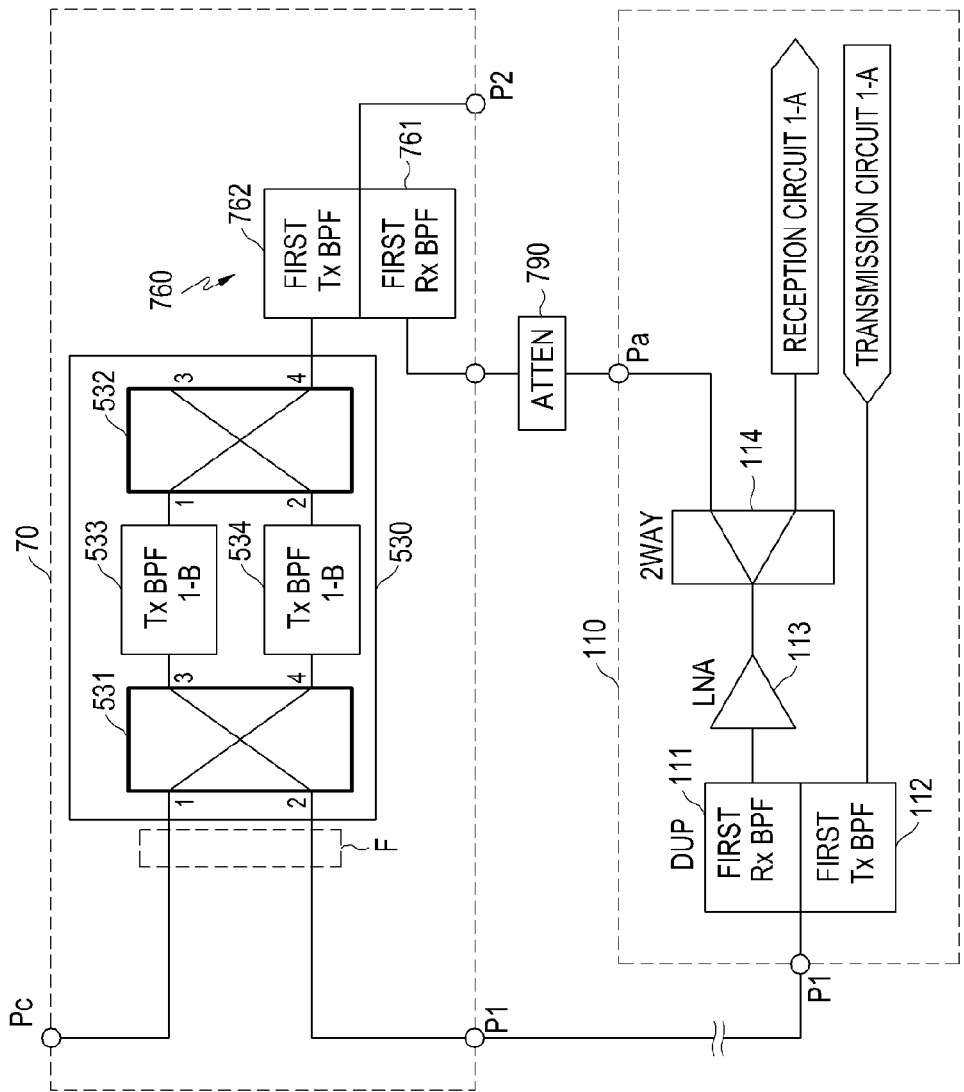
FIG. 9 is a detailed block diagram of a MIMO coupler in an apparatus for sharing antennas of wireless access node systems according to a fourth exemplary embodiment of the present invention.

FIG. 9 is a detailed block diagram of a MIMO coupler in an apparatus for sharing antennas of wireless access node systems according to a fourth exemplary embodiment of the present invention. Referring to FIG. 9, the MIMO coupler A 70 according to the fourth exemplary embodiment of the present invention includes a directional coupler module A 530 having the same configuration as that of the directional coupler module A 530 illustrated in FIG. 6 to allow only a band of a transmission signal in the band 1-B to pass therethrough; and a duplexer 760, which filters transmission and reception signals of the first band, is installed in a connection path between the directional coupler module A 530 and the base station system B 20, filters a reception signal provided from the outside, that is, the base station system A 10 as described below, more particularly, the transceiving unit 1-A 110 of the base station system A 10, transmits the filtered signal to the base station system B 20 through the second port P2, and filters a transmission signal transmitted from the base station system B 20 and provides the filtered signal to the directional coupler module A 530. In the fourth exemplary embodiment of the present invention, it can be seen that only the duplexer 760 may be provided within the MIMO coupler A 70 as a reception signal processing circuit.

The duplexer 760 may have a filter combination structure including a first reception BPF 761 for filtering the reception signal provided by the transceiving unit 1-A 110 through a third port P3 and a first transmission BPF 762 for filtering the transmission signal transmitted by the base station system B 20.

The transceiving unit 1-A 110 of the base station system A 10 may include a duplexer DUP (111 and 112) having a filter combination structure including a first reception BPF 111 and a first transmission BPF 112 for combining and separating the transmission and reception signals. The reception signal filtered by the first reception BPF 111 of the duplexer DUP is amplified by a low noise amplifier (LAN) 113, and a part of the output signals of the low noise amplifier 113 is distributed through a distributor (2way distributor) 114, and then output to the outside through an auxiliary port Pa separately provided in the corresponding transceiving unit 1-A 110.

As described above, the signal output from the auxiliary port Pa of the transceiving unit 1-A 110 is attenuated by an attenuator 790, and then is provided to the first reception BPF 761 of the duplexer 760 through the third port P3 of the MIMO coupler A 70. In this case, the attenuator 790 is configured to attenuate the signal amplified by the low noise amplifier 113 of the transceiving unit 1-A 110 to a level appropriate to be processed by the base station system B 20 again. In the example of FIG. 9, it is illustrated that the attenuator 790 is separately installed between the transceiving unit 1-A 110 and the MIMO coupler A 70, but may also be installed inside the MIMO coupler A 70 as a matter of course.

According to the aforementioned structure, it can be seen that the reception signal of the base station system B 20 is once received in the transceiving unit 1-A 110 of the base station system A 10 through the MIMO coupler A 70, and then is provided to the MIMO coupler A 70 again, and is re-transmitted to the base station system B 20.

In the meantime, it can be seen that the structure of the transceiving unit 1-A 110 has a structure for separating and combining the transmission and reception signals by a frequency division multiplexing scheme. In addition, the transceiving unit 1-A 110 may have a structure for separating and combining the transmission and reception signals by a Time Division Duplex (TDD) scheme, and in this case, a TDD switching unit is provided instead of the duplexer DUP.

The MIMO coupler A 70 according to the fourth exemplary embodiment of the present invention may be configured as described above, and a MIMO coupler B may be configured in the similar manner. A configuration and an operation principle of the MIMO coupler B are the same as those of the directional coupler module A 530 except that a signal of the base station A and a signal of the base station B are processed in an opposite manner.

Figure 10:
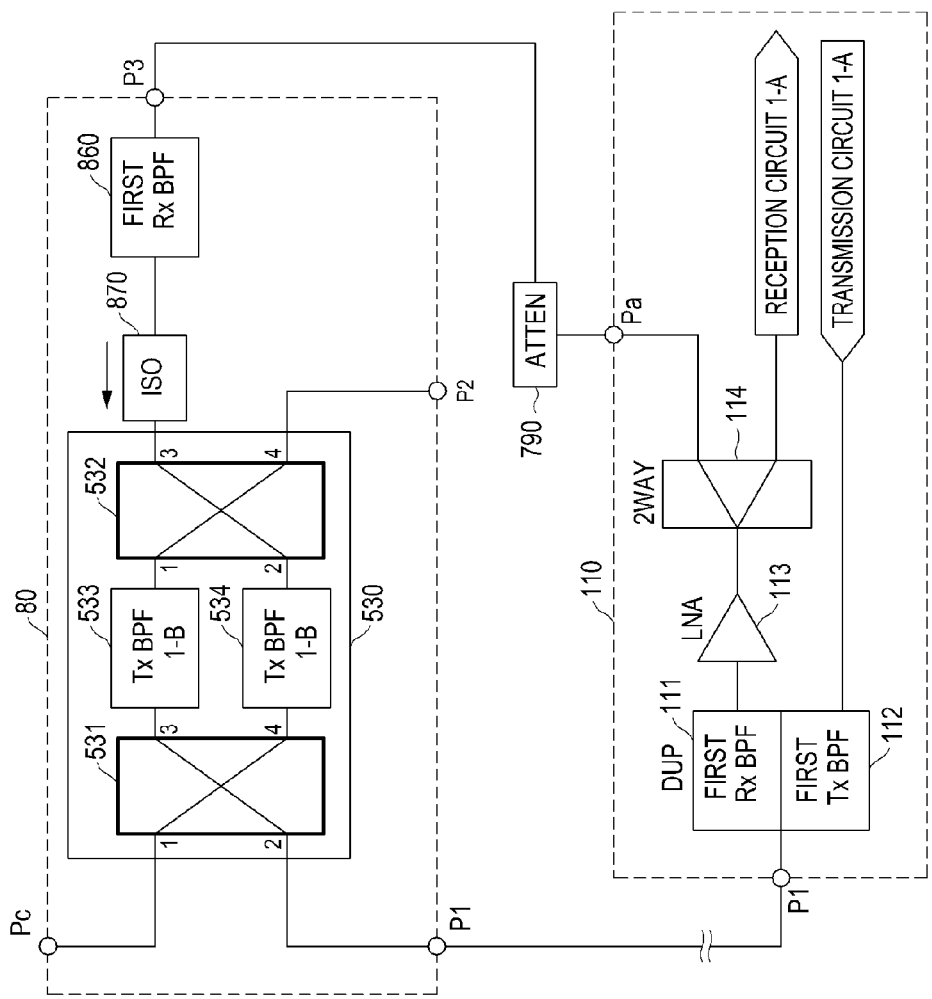
FIG. 10 is a detailed block diagram of a MIMO coupler in an apparatus for sharing antennas of wireless access node systems according to a fifth exemplary embodiment of the present invention.

FIG. 10 is a detailed block diagram of a MIMO coupler in an apparatus for sharing antennas of wireless access node systems according to a fifth exemplary embodiment of the present invention. Referring to FIG. 10, a MIMO coupler A 80 according to the fifth exemplary embodiment of the present invention includes: a directional coupler module A 530 having the same configuration as that of the directional coupler module A 530 illustrated in FIG. 6 to allow only a band of a transmission signal in the band 1-B to pass therethrough; a first reception BPF 860 filtering a reception signal of the first band from a reception signal provided from the outside, that is, the transceiving unit 1-A 110 of the base station system A 10 through a third port P3 and outputting the filtered signal; and an isolator 870 providing the signal output from the first reception BPF 860 to the directional coupler module A 530. In this case, the directional coupler module A 530 further includes a configuration for receiving the reception signal provided through the isolator 870, totally reflecting the received reception signal, and transmitting the totally reflected signal to the base station system B 20 through a second port P2.

In more detail, the reception signal provided through the isolator 870 is input into a number three terminal of the second directional coupler 532 of the directional coupler module A 530. The signals input into the number three terminal of the second directional coupler 532 are distributed and output to a number one terminal and a number two terminal while having a predetermined phase difference (for example, 90 degrees) from each other, and a frequency band of the corresponding distributed signals is the first frequency band, so that the distributed signals are totally reflected by upper and lower transmission BPFs 1-B 533 and 534 and re-input into the number one terminal and the number two terminal. The signals re-input into the number one and two terminals have a predetermined phase difference (for example, 90 degrees), so that the signals are synthesized and output to a number four terminal as a result to be finally provided to the base station system B 20 through the second port P2.

The transceiving unit 1-A 110 of the base station system A 10 has the same configuration as that of the example of FIG. 9, so that the transceiving unit 1-A 110 is configured to output a part of the reception signals to the outside through a separately provided auxiliary port Pa. The signal output from the auxiliary port Pa of the transceiving unit 1-A 110 is attenuated by an attenuator 790, and then is provided to the first reception BPF 860 through the third port P3 of the MIMO coupler A 80.

The MIMO coupler A 80 according to the fifth exemplary embodiment of the present invention may be configured as described above, and a MIMO coupler B may be configured in the similar manner. A configuration and an operation principle of the MIMO coupler B is the same as those of the directional coupler module A 530 except that a signal of the base station A and a signal of the base station B are processed in an opposite manner.

Figure 11:
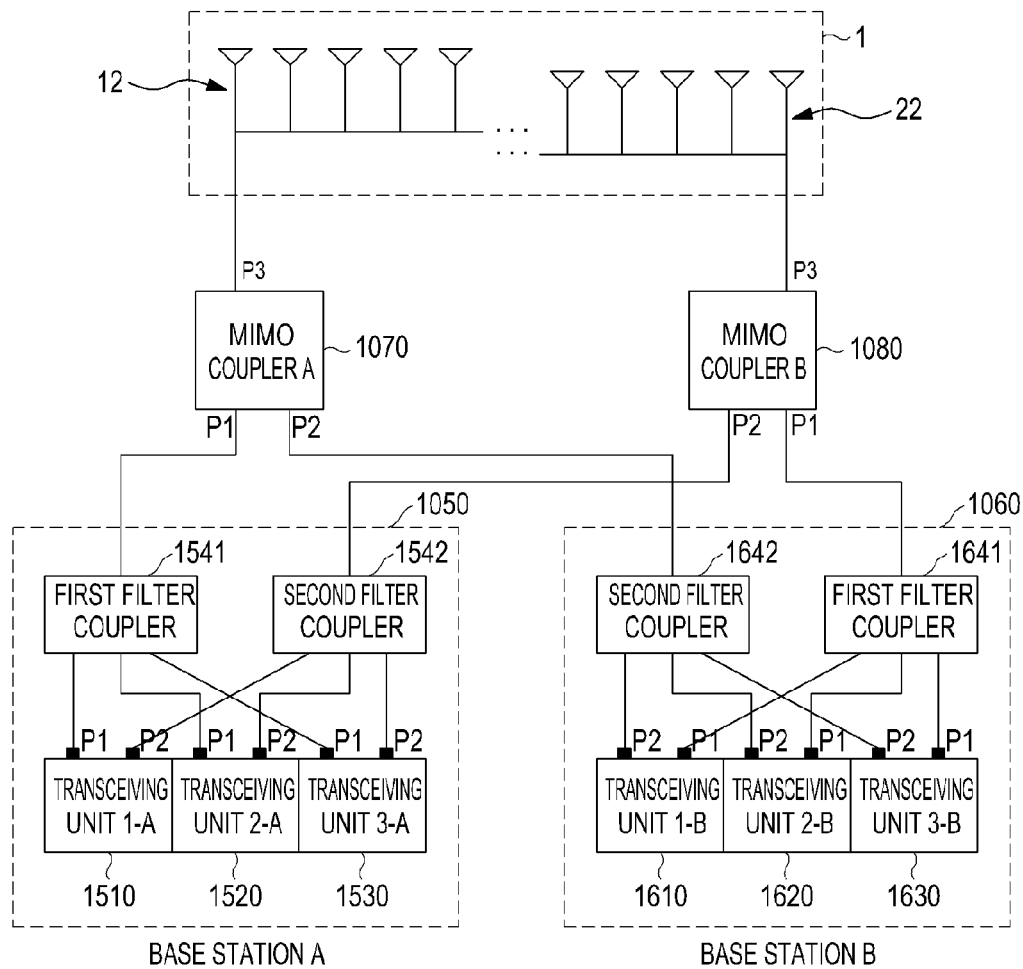
FIG. 11 is a block diagram for an apparatus for sharing antennas of wireless access node systems and related devices according to a sixth exemplary embodiment of the present invention.

FIG. 11 is a block diagram for an apparatus for sharing antennas of wireless access node systems and related devices according to a sixth exemplary embodiment of the present invention, and similar to the first exemplary embodiment illustrated in FIG. 2, a base station system A 1050 and a base station system B 1060 corresponding to wireless communication base stations of business operators A and B are illustrated as an example. Further, similar to the first exemplary embodiment, the base station system A 1050 includes the transceiving units 1-A, 2-A, and 3-A 1510, 1520, and 1530 for processing transmission and reception signals of bands 1-A, 2-A, and 3-A, and the base station system B 1060 includes transceiving units 1-B, 2-B, and 3-B 1610, 1620, and 1630 for processing transmission and reception signals of bands 1-B, 2-B, and 3-B.

In the sixth exemplary embodiment illustrated in FIG. 11, the transmission signals processed by the transceiving units 1-A, 2-A, and 3-A 1510, 1520, and 1530 of the base station system A 1050 through a first transceiving path P1 in a MIMO path are coupled by a first path filter coupler 1541 and provided to a MIMO coupler A 1070 similar to the first exemplary embodiment, but the transmission signals processed by the transceiving units 1-A, 2-A, and 3-A 1510, 1520, and 1530 through a second transceiving path P2 in the MIMO path are coupled by a second path filter coupler 1542 and provided to a MIMO coupler B 1080. Similarly, the transmission signals processed by the transceiving units 1-B, 2-B, and 3-B 1610, 1620, and 1630 of the base station system B 1060 through the first transceiving path P1 in a MIMO path are coupled by a first path filter coupler 1641 and provided to the MIMO coupler B 1080, and the transmission signals processed by the transceiving units 1-B, 2-B, and 3-B 1610, 1620, and 1630 of the base station system B 1060 through the second transceiving path P2 in a MIMO path are coupled by a second path filter coupler 1642 and provided to the MIMO coupler A 1070.

Figure 12:
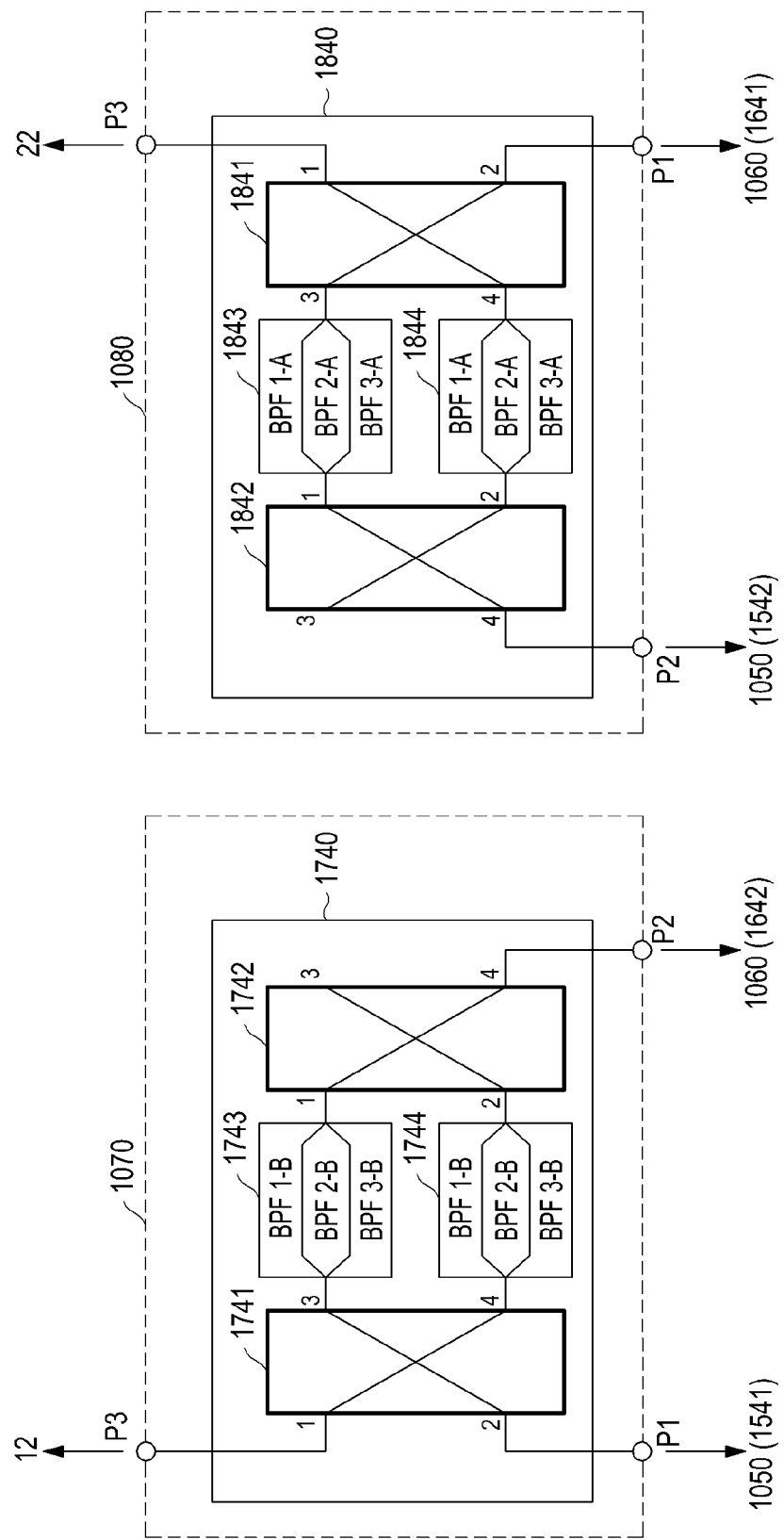
FIG. 12 is a detailed block diagram of an MIMO coupler of FIG. 11.

FIG. 12 is a detailed block diagram of the MIMO couplers, that is, the MIMO coupler A 1070 and the MIMO coupler B 1080, of FIG. 11. Referring to FIG. 12, it can be seen that the MIMO coupler A 1070 and the MIMO coupler B 1080 are implemented as directional coupler modules, that is, directional coupler modules A and B 1740 and 1840, respectively. The directional coupler modules A and B 1740 and 1840 are designed to have a broadband characteristic capable of processing all of the signals of the first to third frequency bands (for example, the bands of 800 MHz, 1.8 GHz, and 2 GHz).

First, the directional coupler module A 1740 will be described in more detail. The directional coupler module A 1740 is configured to receive signals of all of the bands transmitted by the base station system A 1050 through one input/output port, and connected to the base station system B 1060 through another input/output port. In this case, the directional coupler module A 1740 is configured to totally reflect the transmission signal of the base station system A 1050, allow the transmission signal of the base station system B 1060 to pass therethrough, synthesize both signals, and output the synthesized signal to the base station antenna A 12.

The configuration of the directional coupler module A 1740 will be described in more detail. The directional coupler module A 1740 includes first and second directional couplers 1741 and 1742 of a broadband processing the signals of the first to third frequency bands, respectively, and upper and lower BPFs 1-B/2-B/3-B 1743 and 1744 of the base station frequency band B installed in signal paths between the first and second directional couplers 1741 and 1742, respectively. The upper and lower BPFs 1-B/2-B/3-B 1743 and 1744 may have a structure, in which a BPF 1-B filtering a frequency signal of the band 1-B, a BPF 2-B filtering a frequency signal of the band 2-B, and a BPF 3-B filtering a frequency signal of the band 3-B are combined.

The signals input into a number one terminal or a number two terminal have a predetermined phase difference (for example, 90 degrees), and each of the first and second directional couplers 1741 and 1742 distributes and outputs the signal input into the number one terminal or the number two terminal to a number three terminal and a number four terminal, respectively. Reversely, the first and second directional couplers 1741 and 1742 synthesize the signals input into the number three terminal and the number four terminal according to phase differences and output the synthesized signal to the number one terminal or the number two terminal. In this case, the number one terminal of the first directional coupler 1741 is connected to base station system A 1050, and the number two terminal is connected to the base station antenna A 12. The number four terminal of the second directional coupler 1742 is connected with the base station system B 1060. Further, the number three terminal of the first directional coupler 1741 is connected with the number one terminal of the second direction coupler 1742 through the upper BPFs 1-B/2-B/3-B 1743, and the number four terminal of the first directional coupler 1741 is connected with the number two terminal of the second direction coupler 1742 through the lower BPFs 1-B/2-B/3-B 1744.

Next, a principle of the detailed configuration of the directional coupler module B 1840 is the same as that of the directional coupler module A 1740 except that a signal of the base station A and a signal of the base station B are processed in an opposite manner.

That is, the directional coupler module B 1840 includes first and second directional couplers 1841 and 1841 of a broadband processing the signals of the first to third frequency bands, respectively, and upper and lower BPFs 1-A/2-A/3-A 1843 and 1844 of the base station frequency band A (that is, the frequency bands 1-A, 2-A, and 3-A) installed in signal paths between the first and second directional couplers 1841 and 1842, respectively.

The signals input into a number one terminal or a number two terminal have a predetermined phase difference (for example, 90 degrees), and each of the first and second directional couplers 1841 and 1842 distributes and outputs the signal input into the number one terminal or the number two terminal to a number three terminal and a number four terminal, respectively. Reversely, the first and second directional couplers 1841 and 1842 synthesize the signals input into the number three terminal and the number four terminal according to phase differences and output the synthesized signal to the number one terminal or the number two terminal. In this case, the number one terminal of the first directional coupler 1841 is connected to the base station system B 1060, and the number two terminal is connected to the base station antenna B 22. The number four terminal of the second directional coupler 1842 is connected with the base station system A 1050. Further, the number three terminal of the first directional coupler 1841 is connected with the number one terminal of the second direction coupler 1842 through the upper BPFs 1-A/2-A/3-A 1843, and the number four terminal of the first directional coupler 1841 is connected with the number two terminal of the second direction coupler 1842 through the lower BPFs 1-A/2-A/3-A 1844.

The configuration and the operation of the apparatus for sharing antennas of wireless access node systems according to the exemplary embodiments of the present invention may be configured as described above, and the specific exemplary embodiments have been described in the description of the present invention, but various modifications may be carried out without departing from the scope of the present invention.

For example, in the above description, each of the base station systems A and B includes three transceiving units for processing the frequency signals of three bands, but in another exemplary embodiment of the present invention, each of the base station systems A and B may include a plurality of transceiving units for processing frequency signals of two bands or four or more bands, and a configuration for processing the MIMO path of a part of or an entirety of the transceiving units. Further, in addition, each of the base station systems A and B may also include one transceiving unit for processing a frequency signal of one band, and in this case, the base station systems may not be required to include a filter coupler for coupling and distributing the signals of the plurality of transceiving units as illustrated in FIGS. 2, 6, and the like.

Further, in the above description, the directional coupler may be configured by using the 3 dB hybrid coupler, but in addition, the directional coupler may be configured by using a Magic-T coupler. When the directional coupler is configured by using the Magic-T coupler, a phase shifter for adjusting a phase of an input/output signal to be distributed and synthesized may be appropriately provided at the input/output terminal.

Further, in the above description, the MIMO coupler of the present invention includes two couplers, for example, the MIMO coupler A 30 and the MIMO coupler B 40 for the base station system A 10 and the base station system B 20, but in addition, a configuration, in which any one of the MIMO coupler A 30 and the MIMO coupler B 40 is installed, may be available, and the configuration may be usefully used.

As described above, the apparatus for sharing antennas of wireless communication base stations according to the present invention may share antennas of base stations of a plurality of business operators, so that particularly, the present invention is appropriate to establish a system of a MIMO scheme, and it is possible to solve the problems in an increase in installation cost, difficulty in securing an antenna installation space, and non-efficiency of a management of the antenna due to overlapping installation of the plurality of antennas for each business operator in the related art.

What is claimed is:

1. An apparatus for sharing antennas of wireless access node systems in a wireless communication network including wireless access node system A and wireless access node system B, each of which includes one or more transceiving units for processing transmission/reception signals of one or more frequency bands, the apparatus comprising:
   a directional coupler module A that allows a transmission signal provided through a first transceiving path among Multiple Input Multiple Output (MIMO) paths of the one or more transceiving units of the wireless access node system A to pass therethrough with a total-reflection characteristic, allows a transmission signal of a second transceiving path among MIMO paths of the one or more transceiving units of the wireless access node system B to pass therethrough, synthesizes both signals, and outputs the synthesized signal to an antenna of the wireless access node system A; and
   a MIMO coupler A including a reception signal processing circuit providing a part of the reception signals of the antenna of the wireless access node system A through the second transceiving path of the wireless access node system B.

2. The apparatus of claim 1, wherein the directional coupler module A has a broadband characteristic capable of processing entire signal processing bands of the wireless access node systems A and B, and
   includes first and second directional couplers of a broadband, and upper and lower transmission Band Pass Filters (BPFs) having a filtering characteristic of a transmission signal band of the second transmission path of the wireless access node system B installed in signal paths between the first and second directional couplers.

3. The apparatus of claim 1, further comprising:
   a BPF that divides signals of the first transceiving path into a signal of a predetermined first frequency band and a signal of another band, other than the first frequency band, and provides the signal of the first frequency band to the directional coupler module A;

a lower first BPF that commonly receives a transmission signal with the wireless access node system A and the BPF, filters the signal of the first frequency band, and provides the filtered signal to the directional coupler module A; and an upper first BPF that commonly receives a reception signal with the antenna of the wireless access node system A and the BPF, filters the signal of the first frequency band, and provides the filtered signal to the directional coupler module A, and the directional coupler module A receives the transmission signal provided through the first transceiving path of the wireless access node system A through the lower first BPF, and the signal output to the antenna of the wireless access node system A is output through the upper first BPF.

4. The apparatus of claim 1, wherein the reception signal processing circuit includes:

a coupler that couples and outputs a part of reception signals of the antenna of the wireless access node system A; and a duplexer that is installed in a connection path between the directional coupler module A and the wireless access node system B, and couples the reception signal provided from the coupler and the transmission signal transmitted by the wireless access node system B, and divides the reception signal provided from the coupler from the transmission signal transmitted by the wireless access node system B.

5. The apparatus of claim 1, wherein the reception signal processing circuit includes:

a coupler that couples and outputs a part of reception signals of the antenna of the wireless access node system A;

a first reception BPF that filters and outputs the reception signal provided from the coupler according to a predetermined reception signal band; and an isolator that provides the signal output from the first reception BPF to the directional coupler module A, and the directional coupler module A receives the reception signal provided through the isolator, totally reflects the received signal, and transmits the totally reflected signal to the wireless access node system B.

6. The apparatus of claim 1, wherein the reception signal processing circuit includes:

an attenuator that attenuates the reception signal provided by the wireless access node system A; and a duplexer that is installed in a connection path between the directional coupler module A and the wireless access node system B, and couples the reception signal provided from the attenuator and the transmission signal transmitted by the wireless access node system B, and divides the reception signal provided from the attenuator from the transmission signal transmitted by the wireless access node system B.

7. The apparatus of claim 1, wherein the reception signal processing circuit includes:

an attenuator that attenuates the reception signal provided by the wireless access node system A;

a first reception BPF that filters and outputs the reception signal provided from the attenuator according to a predetermined reception signal band; and an isolator that provides the signal output from the first reception BPF to the directional coupler module A, and the directional coupler module A receives the reception signal provided through the isolator, totally reflects the received signal, and transmits the totally reflected signal to the wireless access node system B.

8. The apparatus of claim 1, further comprising:

a directional coupler module B that allows a transmission signal provided through a first transceiving path among MIMO paths of the one or more transceiving units of the wireless access node system B to pass therethrough with a total-reflection characteristic, allows a transmission signal of a second transceiving path among MIMO paths of the one or more transceiving units of the wireless access node system A to pass therethrough, synthesizes both signals, and outputs the synthesized signal to an antenna of the wireless access node system B.

* * * * *